J. PUTNAM.
Seed-Planter
No. 4,405.
Patented Mar. 7, 1846.
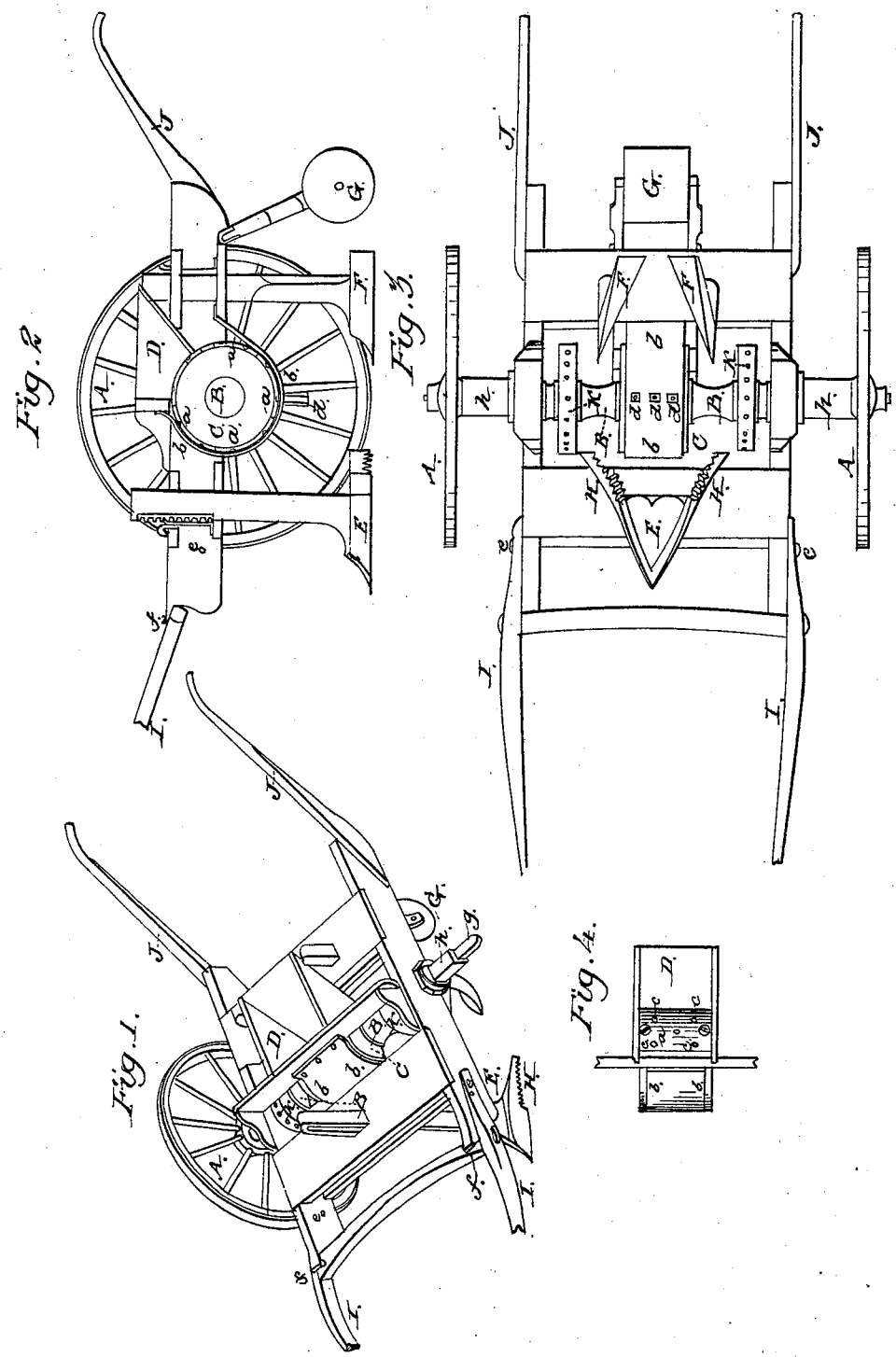

UNITED STATES PATENT OFFICE.

JAMES PUTNAM, OF HAMILTON, NEW YORK.

IMPROVEMENT IN SEED-PLANTERS.

Specification forming part of Letters Patent No. 4,405, dated March 7, 1846.

*To all whom it may concern:*

Be it known that I, JAMES PUTNAM, of Hamilton, in the county of Madison and State of New York, have made certain new and useful Improvements in Machines for Planting Corn and other Seeds; and I do hereby declare that the following is a full and exact description thereof.

My machine is intended to be drawn by a horse and to be guided by handles in the manner of a plow. It is provided with a hopper, within which the seeds are to be placed, the bottom of this hopper consisting of a cylinder, which is placed upon the axle to which the bearing-wheels of the machine are attached, the axle revolving in the wheels. In the periphery of the cylinder there are indentations or cavities formed to receive the corn or other seed, which is carried round by the cylinder until it arrives over the points where it is to be dropped. The seed is retained in the cavities of the cylinder until it arrives at the point of discharge by surrounding it with a flexible band or sheath of sheet metal, which lies in close contact with said cylinder, and at the lower part of such metallic sheath there are openings and dropping-tubes for the passage of the grain, which falls into a furrow or trench made for that purpose by means of a tooth or furrow placed in advance of seed-dropping tubes for that purpose. In the rear of the dropping-tubes there are two covering teeth or shares and a roller, which serve to cover the seed and smooth the ground. The foregoing features of my machine are such in general as have been used individually or collectively in other seeding-machines; but I have made certain improvements in the particular construction and arrangement of certain parts of the apparatus, which remove some of the difficulties heretofore experienced in the use of such machines.

Planting-machines have sometimes been made with changeable cylinders, each cylinder being furnished with cavities for the reception of the grain or seed in such quantity and under such arrangement as was required. This change I effect much more readily and economically than by the construction of several different cylinders by using plates of metal, which are let into the face of the cylinder and attached thereto by screws, so that they can readily be removed and replaced by others. Lead or pewter will answer for such plates, and they may therefore be made without difficulty by any person using the machine.

A machine of this description, when drawn by a horse in shafts, is, when the wheels are made fast to the axle, lifted and turned with considerable difficulty at the end of each furrow. To obviate this difficulty I so attach the shafts to the sides of the machine as to check them from rising beyond a given height—say to the height of a line with said sides. By this arrangement, when it is desired to lift the machine from the ground by the handles, either on one or both sides, it is very readily done, the weight of the fore part being thrown upon the horse when the handles are raised.

It is a point of much importance that the seed dropped into the furrow should be covered without drawing upon it the stones and other hard lumps or trash which exist on the ground. To effect this I place a flaring rake on each side of the furrowing-tooth, which rakes spread out to a width which will throw the stones, &c., out of the way of the coverers and cause them to bring upon the seed the pulverized ground only that is proper for the purpose.

In the accompanying drawings, Figure 1 is a perspective view of my machine, one of the bearing or ground wheels being removed. Fig. 2 is a vertical section through the middle of it from front to back. Fig. 3 is a bottom view thereof, and Fig. 4 is a top view of the hopper with one of the movable plates.

In each of these figures where the same parts occur they are designated by the same letters of reference.

A A are the ground or running wheels, which are made fast to the axle B B, said axle revolving with the wheels, they being received in suitable boxes on the frame.

C is a cylinder, also made fast to the axle. This cylinder may be formed of wood; but I cover its periphery in whole or in part with a series of metallic plates of sufficient thickness to have the cavities made in them that are to receive the seed from the hopper D, which fits close onto the top of the cylinder, so that no portion of the grain contained in it can pass out, excepting that which is received within the receiving-cavities. *a a a* represent these plates, which are to be screwed onto the wood or otherwise fastened in such manner as that they can be readily removed and replaced. One of these plates is shown most distinctly in Fig. 4. The cylinder I surround from the front of the hopper to a point beyond the dropping-tubes by a flexible metallic plate, $b\ b$, which confines the seed within the cavities $c\ c$ until it arrives at the dropping-tubes $d\ d$.

I will suppose my machine to be adapted to the planting of corn, and that the wheels A are nine feet in circumference, and that the cylinder C is three feet in circumference. If the hills are to be three feet apart in the rows, I put onto the surface of the cylinder three plates, furnished with the proper cavities. It will be seen that by this arrangement the distance between the hills is regulated by the size of the wheels and the distance of the indented plates on the cylinder. If it is desired to plant in drills, I then put on such plates, as above described, sufficiently near to each other to answer that purpose, and so on for intermediate distances. The whole cylinder may, as above indicated, be furnished with such plates, which may have cavities in them for different purposes, and by stopping the cavities not wanted with wax or hard putty the trouble of exchanging the plates may be in a great measure obviated.

E is the furrower, the standard of which may be raised or lowered at pleasure to determine the depth of the furrow.

F F are the coverers, which I likewise make adjustable. G is a roller hung on a jointed frame to close and smooth the ground. These parts are similar in their general form and arrangement to such as have been before used; but on each side of the furrower I place flaring rakes H H, which, extending out beyond the sides of said furrower and also beyond the range of the coverers F F, throw the stones and other hard substances out of the way and leave only the pulverized earth to be drawn in by the coverers.

The shafts I I, which work on bolts $e$ on the sides of the machine, are kept from being raised beyond a destined point by allowing the side timbers to project forward, as at $f\ f$, or by check-pins or check-plates affixed to the sides for that purpose. This device, although it may appear trifling at first view, is of real importance in turning the machine at the end of each furrow, the ground-wheels being readily lifted by means of the handles J J, and rendering perfectly easy what has heretofore been attended with difficulty.

When the rows are to be three feet apart the wheels A A are placed at that distance from center to center; but I make them capable of being regulated on the axles, so their distance apart may be varied.

The end $g$ of the axle, Fig. 1, is represented as made square, in which case the hole in the hub is also square.

$h$ is a ferrule or socket, of which there may be two or more, that slip onto the square $g$, and thus determine the distance of the wheels, and by them of the rows from each other.

K K are extra cylinders on the axle B, placed there merely to indicate that more than one may be used on the same axle, if desired.

Having thus fully described the manner in which I construct my machine for planting corn and other seeds, what I claim as new therein, and desire to secure by Letters Patent, is—

1. The combining of the lateral rakes H H with the furrower for the purpose of preventing the coverers from drawing in stones or other hard substances over the seeds.

2. The device described for the checking of the shafts, as set forth, in order to facilitate the turning of the machine at the end of each furrow.

JAMES PUTNAM.

Witnesses:
  THOS. P. JONES,
  EDWIN L. BRUNDAGE.